United States Patent Office 2,907,718
Patented Oct. 6, 1959

2,907,718

POLYURETHANE OF A POLYISOCYANATE, AN ACTIVE HYDROGEN COMPOUND AND A RESINOUS POLYBASIC ACID AND METHOD OF PREPARING SAME

Sylvan O. Greenlee, Racine, Wis., assignor to S. C. Johnson & Son, Inc., Racine, Wis.

No Drawing. Application January 28, 1957
Serial No. 636,477

9 Claims. (Cl. 260—2.5)

This invention relates to novel resinous compositions of matter of the polyurethane type and is directed more particularly to synthetic resinous compositions derived from the reaction of resinous polybasic acids with polyisocyanates in presence of an organic compound capable of entering into the reaction and exerting an influence upon the nature of the resulting product.

It is known a urethane resin may be obtained by reacting a polyisocyanate or polyisothiocyanate with a group of compounds characterized by one or more of what has been termed "an active hydrogen group." Foremost among the "active hydrogen" compounds, at least as regards commercial development, have been the polyester compounds, although polyhydroxy-, polyamino-, polyamido- and polythio-compounds are also recognized as being more or less useful in this connection. The resinous products derived from this reaction are dependent for their characteristics, for the most part, upon the structure of the active hydrogen compound with the isocyanate acting principally as a physical coupling agent between residues of the polyester or other compound. The range or variety of properties has thus been limited by the types of structures possessed by available active hydrogen compounds, and the formulator has often found it quite difficult to develop products having the desired characteristics.

The primary object of the present invention is the incorporation in a polyurethane-forming mixture of a compound having multiple functionality both with respect to isocyanates and isothiocyanates and active hydrogen compounds, by means of which compound a broad spectrum of polymers of this type can be obtained.

Another of the objects of this invention is to provide a new class of synthetic resinous compositions which are capable of further reaction to give infusible, insoluble materials suitable for use as protective coatings, adhesives, and molding resins having a variety of properties.

A further object is the synthesis along the general lines of established urethane reactions of a film-forming product characterized, by virtue of the novel reactants from which it is derived, with improved properties especially as regards resistance to attack by common chemicals, resistance to wear or damage, and resistance to penetration and solvent action by water.

By suitable adjustment of the conditions of the reaction and the ingredients, the product of the invention may be caused to assume a cellular or foam state, and, accordingly, an additional aim of the invention is the provision of light-weight three-dimensional solids possessing good structural strength and, therefore, useful in load-bearing applications.

These and other objects are accomplished by the present invention which contemplates the reaction of a substantial amount of an isocyanate or isothiocyanate, at least half of which must contain two or more isocyanate or isothiocyanate groups per molecule, with a resinous polybasic acid produced by condensing a polyfunctional coupling agent with an aliphatic acid, having a total of at least five carbon atoms with a single carbon atom being substituted with two hydroxyaryl groups; and an organic compound having as active hydrogen groups at least two of the following radicals YH, CYYH, $NH_3$, and $CYNH_2$, where Y is oxygen or sulfur, which compound is free of interfering reactive groups.

It has been found that the addition of resnious polybasic acids to a polyisocyanate-active hydrogen compound reaction mixture is an unusually advantageous measure for obtaining polymeric resinous compositions characterized by excellent protective coating and adhesive properties when used as a film, and high structural strength when cast into foam resin bodies. The resinous polybasic acids are especially adapted for the reaction by virtue of the presence in each molecule thereof of a large number of carboxyl groups. As will be explained more fully, carboxyl radicals condense with an isocyanate group and, thus, contribute to the formation of an insoluble, infusible product; in addition, the carboxyl radical during the course of the condensation decomposes to liberate carbon dioxide which can be made use of in producing foam resin structures. The resinous polybasic acids are high melting polymeric compositions having a large number of unique symmetrical residues and tend to contribute to the reaction product such properties as outstanding chemical resistance and superior hardness and toughness. Chemical resistance is, for example, of great value in the formulation of protective coatings which are likely to be subjected in the course of ordinary usage to contact with various chemicals. The presence in the ultimate resin of a multiplicity of residues of symmetrical structure results in a more rigid product, a feature of much advantage in polyurethane foams.

The resinous polybasic acids contemplated for use herein are compounds containing a large number of molecules of a bis-hydroxyaryl aliphatic acid which are coupled one to another through ether oxygen by alkylene or substituted alkylene radicals. They may be prepared, for example, by heating a bis-hydroxyaryl-aliphatic acid, such as 4,4-bis-(4-hydroxyphenyl)-pentanoic acid, in the presence of alkali, with a di-functional coupling agent, such as dihalohydrin, a dihalide, or an epihalohydrin. Illustrative possible polycarboxylic acids are the following:

4,4-bis(4-hydroxyphenyl)-pentanoic acid + dichlorobutene

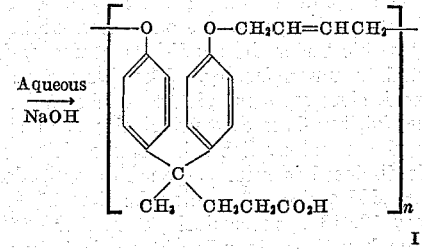

I 4,4-bis(4-hydroxyphenyl)-pentanoic acid + dichlorodiethyl ether

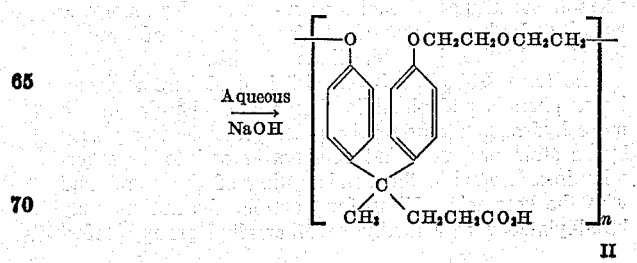

II 4,4-bis(4-hydroxyphenyl)-pentanoic acid + epichlorohydrin

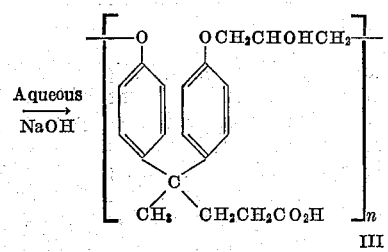

III 4,4-bis(4-hydroxyphenyl)-pentanoic acid + bis(4-hydroxyphenyl)-isopropylidene + 1,4-dichlorobutane

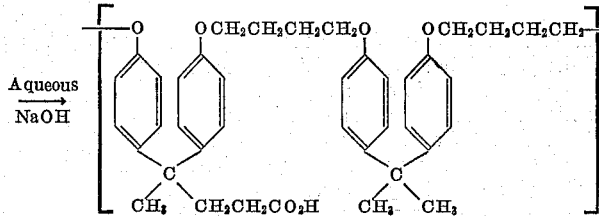

IV wherein $n$ indicates the degree of polymerization and depends for its value on the quantities of reactants employed, the maximum value for $n$ having been found to be less than about 15. The compound shown at IV illustrates one method of obtaining a lower acid number should it be desirable for a particular use.

The terminal groups in all of these polycarboxylic acids will vary depending on the ratio of bis-hydroxyaryl-aliphatic acid to aliphatic coupling agent. If excess of the former is used, for example, in reaction with dichlorobutene, the end groups will be phenolic hydroxyl groups. If, on the other hand, dichlorobutene is used in excess, the end groups will be chlorobutene groups.

The bis-hydroxyaryl-aliphatic acids used in the preparation of the resinous polybasic acids according to this invention may be, and preferably are, prepared by condensing a phenolic compound with a keto-acid under such conditions that two hydroxyaryl radicals are attached to the same carbon atom of the acid. In order for the yields of this reaction to achieve useful levels, it is necessary, first, that the keto-carbon atom occur at the position adjacent a terminal methyl group, and, second, that the keto-acid have at least five carbons in the aliphatic chain. The keto-acid of this type which has only four carbon atoms, aceto-acetic acid, is highly unstable under the conditions necessary for the reaction and is unsatisfactory. The five-carbon acid, levulinic acid, gives excellent yields. Higher acids are apparently useful, but these exist principally as laboratory curiosities and are not available in commercial quantities. There is disclosed in prior co-pending applications, Serial Nos. 464,607 and 489,300, filed October 25, 1954, and February 18, 1955, respectively, a number of illustrative acids that have been found to be particularly suitable for use, as well as methods of preparing the same. These acids consist of the condensation products of levulinic acid and phenol, substituted phenols, or mixtures of phenol and substituted phenols and shall, for the sake of brevity, be referred to herein as "the diphenol acids."

The term "substituted phenols" is used herein to embrace phenols and phenolic compounds wherein one or more hydrogen atoms of the phenyl nucleus is replaced by an atom or group that does not enter into, or otherwise interfere with, the condensation of the compound with the keto-acid. Thus, for example, the nucleus may be alkylated with a methyl or other alkyl group, preferably having not more than five carbon atoms, as disclosed in the aforementioned application, Serial No. 489,300, or halogenated with bromine, fluorine, chlorine, or combinations thereof, provided that a total number of substituents, including hydroxyl groups does not exceed three. The diphenol acids derived from substituted phenols, such as the alkylated phenols, are sometimes more desirable than the products obtained from unsubstituted phenols since the alkyl groups tend to provide better organic solvent solubility, flexibility, and water-resistance, as well as influencing the nature and extent of subsequent reactions for which the acids are adapted. However, the unsubstituted product is usually more readily purified.

The coupling agents advantageously used in building up the desired molecular structure of the resinous polycarboxylic acids must be bifunctional in their reactions with phenolic hydroxyl groups in the presence of alkali. Exemplary coupling agents having this characteristic are the aliphatic dihalides. The reaction of a phenolic hydroxyl group with an alkyl halide forms an ether linkage by the well known Williamson synthesis, employing an alkali metal phenoxide:

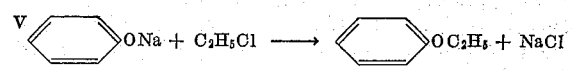

V

Similarly, the use of a dihalide and a dihydric phenol results in a polymeric structure having alternating aryl and alkyl groups joined to one another by ether oxygen linkages.

From the discussion of the reaction, one will be able to deduce that virtually any dihalide will be suitable as a coupling agent, provided that it contain no substituents which react with an alkali metal phenoxide or otherwise interfere with the etherification reaction. Illustrative dihalides are 1,2-dichloroethane, 1,3-dichloropropane, 1,4-dichlorobutane, 1,4-dichlorobutene, glycerol dichlorohydrin. Also appropriate are the oxy-dihalides wherein one of the carbon atoms is replaced by oxygen or is hydroxylated, such as the alkylene halohydrins or ethers, an example of which is bis(2-chloroethyl)ether. Halogens other than chlorine may, of course, be present. The dihalide may be saturated or unsaturated and contain up to about 10 carbon atoms.

An additional class of coupling agents operable herein is the simple difunctional epoxy compounds, it being known that an epoxide group is converted by a phenolic hydroxyl group to form an ether linkage. Preferred epoxy compounds are the epihalohydrins, such as epichlorohydrin or epibromohydrin. Also suitable are the oxy-epihalohydrins wherein one of the carbon atoms is replaced by ether oxygen, an illustration being 2,3-epoxypropyl-2-hydroxy-3-chloropropyl ether, as well as the simple aliphatic polyepoxides.

As is apparent from the preceding discussion of the polybasic acids and operable components thereof, the aliphatic coupling agents of the polybasic acid can be represented by the general formula X—A—X, wherein X is a member of the group consisting of halogen atoms and vicinal epoxide groups and A is a divalent radical; the coupling agent X—A—X having a total of from 2–10 carbon atoms. The divalent radical can be selected from the group consisting of alkylene, hydroxyalkylene, dialkylene ether, vinylene, and mixtures thereof.

Reaction of the bis-hydroxyaryl aliphatic acids with dihalides or mixed epoxyhalo compounds is carried out in the presence of sufficient amounts of a strong alkaline compound, such as sodium hydroxide, to neutralize the carboxyl group of the acid and to react with the halogen group of the halide or halohydrin. To illustrate: the reaction of one mol of the acid with one mol of epichlorohydrin would require 2 mols of sodium hydroxide, one to neutralize the carboxyl group, and one to take up the chlorine ions liberated from epichlorohydrin in the reaction. Similarly, the reaction of two mols of the acid with one mol of a dichloride would require four mols of sodium hydroxide. Usually, in practice alkali is used somewhat in excess of the theoretical amounts to insure the presence of adequate amounts. Alkaline reactions of this type are conveniently carried out in aqueous solution; however, highly polar organic solvents may be used. Preferably, the temperature is maintained within the range of 75–150° C. during the reaction. Thus, the condensation of an epihalo compound, such as epichlorohydrin, with a bis-hydroxyaryl aliphatic acid to give the polybasic acids might, for example, be carried out at temperatures of from 75–100° C. for periods of 30 minutes to an hour. The reaction of active chlorides, such as 1,4-dichlorobutene, with the sodium phenoxide groups also proceeds well at relatively low temperatures, of around 100° C., for short periods of time, of about 1 hour. Less reactive halides, such as 1,4-dichlorobutane, on the other hand, require more vigorous reaction conditions of several hours' heating at about 100° C., or of higher temperatures for shorter periods of time.

The simple aliphatic polyepoxides demand the exercise of much more care in neutralizing the carboxyl group of the acid, either by way of esterification or formation of a salt, to prevent it from taking part in the reaction than do the halogen-containing coupling agents. With these compounds, the temperature should be maintained within the range of about 90–200° C. Preferably, the reaction is effected in the absence of a solvent although an organic solvent can be used provided it is free of functional groups that might interfere with the epoxide-phenolic hydroxyl addition. If the simple polyepoxides are to be reacted with an alkyl ester of the acid, the use of a trace amount of a catalyst such as boron trifluoride adducts, is recommended in order to accelerate the addition.

The second component necessary for the reaction of the present invention is an isocyanate or isothiocyanate compound. In order that a resinous product be obtained, the isocyanate or isothiocyanate compound must contain two or more isocyanate or isothiocyanate groups, a plurality of functions being essential if a chain or cross-linked structure is to be developed by condensation with the functional groups of resinous polybasic acid and/or the active hydrogen compound. Accordingly, the isocyanate may be defined as a compound having the general formula $R(NCX)_z$, where X is a chalcogen having an atomic weight less than 33, i.e., oxygen or sulfur; $z$ is an integer of more than one; and R is a polyvalent organic radical with the number of valences being equal to $z$. There are numerous compounds coming within this formula that are suitable for the reaction and no attempt will be made to give an exhaustive list. The following are considered illustrative and will suggest to the expert a variety of others: alkylene diisocyanates, such as ethylene diisocyanate, trimethylene diisocyanate, tetramethylene diisocyanate, hexamethylene diisocyanate, decamethylene diisocyanate, and their corresponding sulfur analogues; cyclo-alkylene diisocyanate, such as cyclopentylene diisocyanate, cyclohexylene diisocyanate, and their corresponding sulfur analogues; aromatic diisocyanates, such as m-phenylene diisocyanate, naphthalene diisocyanate, diphenyl-4,4'-diisocyanate, and their corresponding sulfur analogues; aliphatic-aromatic diisocyanates, such as xylene-1,4-diisocyanate, diphenylene methane diisocyanate and their corresponding sulfur analogues; hetero-, diiso- and diisothiocyanates, such as $SCNCH_2OCH_2NCS$ and $SCNCH_2SCH_2NCS$; and isocyanates and isothiocyanates having more than two isocyanate or isothiocyanate groups, such as benzene 1,2,4-triisocyanate, 1,2,2-triisocyanatobutane, and toluene triisocyanate. From among these and other polyisocyanates and polyisothiocyanates, the following are preferred largely by reason of their ready commercial availability: toluene 2,4 - diisocyanate, toluene 2,6 - diisocyanate, methylene bis-(4-phenyl isocyanate), 3,3'-bitolylene 4,4' diisocyanate, and hexamethylene diisocyanate. In order to simplify the remainder of the discussion, the repetitious recital of both the oxygen and sulfur forms will be dispensed with; only the oxygen compound will be given but will be understood as embracing the corresponding sulfur analogue.

While, as has already been mentioned, polyurethane formation requires a polyisocyanate compound, it is desirable for certain applications to alter the product by using, in addition, a minor portion of a monoisocyanate. Some of the reaction products of resinous polybasic acids with polyisocyanates tend to be brittle infusible products but this tendency may frequently be counteracted by the addition to the reaction mixture of a proper amount and type of monoisocyanate, particularly when combined with the proper amount and type of active hydrogen compound. Examples of suitable monoisocyanates are octadecylisocyanate and hexyl isocyanate, to mention just a few of the simpler compounds. Long-chain monoisocyanates, i.e., having more than 11 carbon atoms, are more effective as regards flexibility. Unsaturated compounds can also be utilized and provide an additional curing or converting aid. The amount of the mono-compound that is added to the reaction mixture will vary depending upon the characteristics desired in the product. As a general rule, there should be present a greater amount of the poly-compound than the mono-compound, which is to say, that the monoisocyanate should be less than 50% of the total of all isocyanates in the reaction mixture. If a more rigid, brittle material is sought, the quantity of the mono-form should be decreased while, if more flexibility is the desideratum, it should be increased toward the upper limit just mentioned. The functional group of the mono-form may react with the carboxyl groups of the acid to reduce cross-linking between adjacent molecules and thereby enhance the softness and pliability of the polymer in proportion to the amount present, or it may react with the terminal hydroxyl groups of the acid polymer and, preclude further growth at the ends of the chain. Reaction of the mono-compound and the active hydrogen compound is also a possibility, which reaction may also end the lengthwise growth of the polymer molecule or reduce cross-linking.

The active hydrogen compound is the final component of the reaction mixture described herein. For the purpose of the invention, the active hydrogen compound must include at least two of the radicals —OH, —COOH, —CONH$_2$, —NH$_2$, —SH, —COSH, —CSNH$_2$. To simplify the discussion, compounds meeting this requirement have been grouped into the following classes: (A) the polyhydroxy compounds, (B) the polybasic acids, (C) the polyamines and polyamides, (D) miscellaneous analogous sulfur compounds, and (E) the polyester resins. As will be seen later, compounds containing more than one type of radical, i.e., "hybrid" compounds, have not been classified independently but are included in these five groups. In this case, as a rule, the compound is classified in that group, of the several into which it might fall by virtue of the radicals it contains, which has the highest numerical designation in accordance with the preceding break-down. For example, a compound containing both hydroxy and mercapto-radicals appears with the sulfur compounds, and a compound having recurring ester linkages and free carboxyl radicals appears with the polyesters.

The first of these classes are the polyhydroxy compounds, which, as contemplated herein, embraces the aliphatic, alicyclic, heterocyclic, and aromatic compounds containing at least two hydroxy radicals. Examples of these compounds are the alkylene glycols, such as ethylene glycol; polyalkylene glycols, such as diethylene glycol and the "Carbowax" series manufactured and sold by the Carbide and Carbon Chemical Company; glycerol, erythritols, higher alcohols, such as mannitol and sorbitol; aromatic alcohols, such as resorcinol, hydroquinone, and bis-phenol; and resinous alcohols, such as the epoxides. Mixtures of resinous polybasic acids with dihydric phenols, particularly the alkylidene diphenols, in reaction with the isocyanates give rigid, infusible products possessing excellent chemical resistance to alkali and water when formed as films and outstanding rigidity when cast as foam resin structures. It is well known that the polyhydric alcohols, such as the long-chain glycols, give on reaction with the isocyanates soft flexible-type compositions of relatively low chemical resistance. Modification of these compositions with resinous polybasic acids has been found to greatly increase the chemical resistance of protective coating films prepared therefrom as well as to strikingly heighten the rigidity of foam resin structures produced therefrom.

Next in the classification are the polybasic acids. Examples of these acids are the saturated aliphatic polycarboxylic acids, such as adipic acid, tricarballylic acid and azelaic acid; unsaturated aliphatic polycarboxylic acids, such as fumaric acid and aconitic acid; and aromatic polybasic acids, such as the isomers of benzene dicarboxylic acid. Polyfunctional acids are of particular interest in connection with the formation of resin foams, as the carboxyl group decomposes upon reaction with an isocyanate to release carbon dioxide. With the addition of a resinous polybasic acid, further carbon dioxide is available from the carboxyl group of the resinous acid and enhanced foaming results. This is advantageous since enhanced foaming was previously obtained by adding substantial amounts of water. As is well known, water reacts with an isocyanate to yield carbon dioxide and a carbamide. In addition to enhancing the foaming action, the resinous acid serves to strengthen the rigidity of the foam and causes the cell arrangement to be disconnected or closed rather than open. Where the combination of isocyanate, polybasic acid and resinous acid is used as a film or coating, the last tends to balance the essentially soft influence of the polybasic acid, permitting the formulation of tougher, harder films than would otherwise be the case. One interesting property of the polybasic acids in this association is their tendency to improve the water resistance of the film, presumably due to the hydrophilic character of such acids. Films which are highly hydrophobic are whitened by prolonged contact with water. By adding material having hydrophilic properties to the film-forming mixture, the hydrophobic character of the film can be reduced to a level at which whitening does not occur without undue loss of over-all resistance to water.

The third class, the polyamines and polyamides, is characterized by the presence of an —NH₂ radical, which in the case of the polyamides is combined with a carbonyl group as the radical —CONH₂. Examples of this class are the alkylene and polyalkylene diamines, such as ethylene diamine and hexamethylene diamine; heterocyclic polyamines, such as diethylene diamine; triethylene tetramine; and aromatic polyamines, such as phenylene diamine; the aliphatic diamides, such as malonamide, succinamide and adipamide; aromatic diamides, such as phthaldiamide; and the resinous polyamides. Compounds containing at least two amino radicals are of particular value in accelerating the reaction. It is interesting to observe that polyamines are inclined to impart flexibility to products while polyamides are disposed to impart rigidity. Thus, a product of balanced flexibility-rigidity, or increased rigidity, may be obtained by the addition of a resinous acid. The poly-nitrogen compounds are also useful where products having high chemical and water resistance are sought.

Another class of active hydrogen compounds is the sulfur-containing chemicals. As a general rule, this class embraces the corresponding sulfur analogues of the members of the other classes. Thus, polythiols, such as ethanedithiol and propane-trithiol, polythioacids, polythioamides, and resinous polythio-compounds are included, among others. The most useful of these compounds are the thioresins sold under the trade name "Thiokol" and prepared by reacting an alkaline polysulfide with an organic dihalide, trihalide, or mixtures of the two. These polymers are thought to have thiol terminal groups. Preferably, the liquid polymers are employed because of their relatively low molecular weight, ease in handling, and ease in admixing with other reactants. As is well known, these materials undergo reaction with various coupling agents or can be cured with numerous curing agents to form rubbery polymers which are usually soft and flexible. When compounded with a resinous polybasic acid and an isocyanate, thioresins yield smooth, tough, flexible products having much augmented chemical resistance. Other sulfur compounds, such as the simple mercapto acids and mono- and di-mercaptans, may be used in conjunction with the resinous acids in the formulation of valuable coating, adhesive, and molded objects.

Finally, there are the polyester resins, which are polymers, having recurring ester linkages and unreacted hydroxyl and carboxyl terminal groups formed by reacting a polybasic acid with a polyhydric alcohol. The nature of the reactive groups is determined by the proportion of the reactants. Thus, an excess of the alcohol favors terminal hydroxyl groups while an excess of acid favors terminal carboxyl groups. By properly balancing the amounts of each, terminal groups of both kinds can be procured. There are a number of polyester compounds available commercially, one example being a series having hydroxyl values ranging from 70–1000 and acid numbers ranging from 0–80 sold under the trade name "Multron" by the Mobay Chemical Company. Among the polybasic acids that can be used are succinic, adipic, maleic, sebacic, azelaic, fumaric, and dimerized acids, such as dimer fatty acids prepared and sold by Emery Industries, Inc. Suitable polyhydric alcohols include ethylene glycol, diethylene glycol, triethylene glycol, pentaerythritol, dipentaerythritol, tripentaerythritol, sorbitol, mannitol, glycerine, trimethanol propane and triethanol propane.

It is well known that reaction of polyester resins with the polyisocyanates results in soft flexible foam resin structures and soft coating compositions and molding materials. The use of resinous polybasic acids in conjunction with these polyesters and isocyanates has been found to be an excellent mode of promoting rigidity in foam resin structures of this type. Thus, moderately-to-completely stiff three-dimensional articles can be easily obtained merely by incorporation of the acid in selectively increased amounts. Variation in density of the solid product may also be effected by this means. In the field of protective coatings and adhesives, an analogous hardening and toughening influence by the resinous acid exists so that products of this kind display substantially enhanced resistance to chemical attack and deterioration as well as general wear and tear without necessarily involving undue sacrifice of the natural flexibility and clarity of the polyester resins.

The general chemistry of the present reaction is basically simple. It is well known that isocyanates react with the various chemical functional groups of the compounds employed herein and these reactions may be illustrated as follows:

(1) Hydroxyl group:

$$ROH + R'NCO \rightarrow R'NHCOOR$$

(2) Carboxyl group:

$$RCOOH + R'NCO \rightarrow R'NHCOOCOR \rightarrow R'NHCOR + CO_2$$

(3) Primary amino group:

$$RNH_2 + R'NCO \rightarrow R'NHCONHR$$

(4) Amido group:

$$RCONH_2 + R'NCO \rightarrow R'NHCONHCOR$$

The same reactions take place where sulfur is substituted for any oxygen in these reactants.

In the present invention, it is postulated that the reaction occurs within a system of three or more components, each of which is characterized by at least double functionality. Accordingly, while the union of any two groups will proceed as set forth above, it will be appreciated that the resultant product will in any case be polymeric. Further, it will be apparent that the possible arrangements that may be taken within the polymer molecule by the residues of the reactants are entirely too numerous to be presented herein. Due to the high reactivity of isocyanate groups, one would expect the condensation between these groups and the functional groups of the resinous polybasic acid to take precedence over any possible reaction between the acid and the active hydrogen compound. Thus, it can be predicted that the polymer molecule comprises acid residues linked together by isocyanate residues alone or which are themselves coupled by means of the residues of the active hydrogen compound. Where the isocyanate and active hydrogen compound are difunctional, the acid residues would be separated by essentially linear chains with cross-linking taken place between the residues in adjacent chains due to the large number of reactive groups of the resinous acids. With isocyanates and/or active hydrogen compounds having more than two functions, cross-linking to a much greater degree would ensue.

The diversity of the isocyanates and active hydrogen compounds that can be employed makes it virtually impossible to prescribe a fixed set of rules governing the choice of a class of compounds, the particular member of that class, as well as the amounts of the member. Some of the classes and their individual members are more or less equally suited for use in producing a given product so that a choice depends in many instances upon the personal preference of the formulator, such preference being based, for example, on his greater experience in working with certain types of materials than with others. As a rule, aliphatic compounds favor flexibility and softness with the extent of these properties increasing with the chain length. Conversely, compounds having a tightly knit or cyclic molecular structure favor rigidity and hardness. As a consequence, a wide range of properties can be developed by the careful selection of reactants: that is, all may promote flexibility, all may promote rigidity, or some one and some the other in order to cover the gamut between the two extremes.

Along with the specific reactants, the properties of the product are also influenced by the amount of each reactant that is employed. Because of the high reactivity of the isocyanate, for the purpose of defining proportions it may be considered that the polybasic acid and the active hydrogen compound react as a "unit" with the isocyanate. Within this suppositious "unit," the active compound may constitute from about 5 to about 65% of the whole, determined on the basis of equivalent weight, with the acid making up the rest. Below 5%, the effects of the active compound are rarely significant, while above 65%, the contribution of the acid is ordinarily counteracted excessively or is not sufficiently great to be of real value. Experience has indicated that the acid and the active hydrogen compound, considered together, may be reacted in amounts, again calculated on an equivalent basis, varying from about one-fifth of the isocyanate up to about five times the isocyanate. Some products prepared from amounts outside this range may display useful characteristics attributable to all three of the reactants, but this appears to be the exception rather than the rule; and, for the most part, valuable products fall within this range. From a consideration of the reaction, it will be appreciated that the optimum situation prevails where all of the functional groups of the acid and active hydrogen compound are reacted with functional groups of the polyisocyanate. For this reason, a preferred range is 2:1 to 1:2 of acid and active hydrogen compound to isocyanate on an equivalent basis with a 1:1 ratio being most desired.

If a monoisocyanate is employed along with the polyisocyanate, the number of reactive foci of the polybasic acid and the active hydrogen compound available to the functional groups of the polyisocyanate is lessened. In arriving at the amounts of reactants to be utilized, the mono-compound must therefore be considered, and in such case the equivalent weight of the isocyanate is the total of the equivalent weights of the mono- and poly-compounds.

In general, the procedure by which protective coating films are prepared in accordance with the present invention involves merely adding at ordinary temperatures the resinous acid and active hydrogen compound to the isocyanate, forming a film of the desired thickness of the mixture, and converting the mixture by exposure either to normal temperatures or to heat. In instances where the reactants are solids, it is necessary to dissolve such reactants in order to form a film in this manner. Any solvent that is inert to the reactants employed may be used, an example being methyl ethyl ketone among many others. The mixture of reactants, either diluted or not, has been found to be reasonably stable for moderate periods at normal temperatures. Such stability is a feature of some importance as it permits large quantities of the mixture to be made up at one time and then used as needed. For heat cure, temperatures of about 100–225° C. for times of about one hour to about five minutes have been found satisfactory. For a normal temperature cure, it is preferred that any of the well known conversion catalysts for reactions of this type, such as triethanolamine, be added in small amounts in order to reduce the amount of time needed for the film to harden. When early conversion is of no special advantage, the catalyst may be dispensed with. As the examples show, the characteristics of the cured films vary with the particular combination of reactants and amounts that are employed, with some being better than others, as would ordinarily be expected. As a whole, however, the films possess characteristics that compare favorably with many other available materials so that the product of the invention is quite useful for a variety of purposes. For example, in numerous instances, the films of this invention have withstood boiling water for 16 hours and a 5% caustic solution for more than 90 hours without any indication of failure.

Where solid foam or cellular structures are desired, they may be obtained by mixing the concentrated resinous acid and active hydrogen compound with a suitable conversion catalyst, of which triethanolamine is again an example, in an appropriate reaction vessel at temperatures at or above the melting point of the acid, adding the isocyanate while agitating, pouring the mixture into a mold, allowing the mixture to foam unimpeded, and converting by heating, as in a draft oven, at a temperature of about 80–175° C. or more for from about 5–30 minutes, or by normal temperatures for much longer periods. Although not essential, it is usually desirable to employ an emulsifier in order to obtain a more homogeneous mixture of the reactants. The reaction usually proceeds instantaneously at or above the melting point of the acid. The instant process may be carried out readily in any system which provides for stirring and has sufficient space for the foaming action to proceed unhindered. A modification of a unit currently used in commercial urethane foam production may be employed. Such a system comprises two supply tanks connected to a pressure-mixing nozzle by suitable feed lines. One tank contains the isocyanate and the other tank, which is necessarily heated, contains the resinous acid and active compound emulsified with the emulsifying agent and catalyst. The acid and isocyanate are fed from the tanks to the nozzle where they are mixed under pressure and flowed into pans where the foaming reaction is allowed to proceed unhindered. Again, the foams may be cured in a suitable draft oven at elevated temperatures, thus accelerating the operation. Although the foams may be cured by exposure to normal temperatures as in the case of the films, this considerably prolongs the curing time and a heat cure is preferred.

As has already been briefly mentioned, the resinous polybasic acids as well as carboxyl-containing active compounds are especially well suited for the formation of urethane foams by reason of the carboxyl group or groups which they contain. These groups in the course of the reaction decompose to form gaseous carbon dioxide which bubbles through the mixture to produce a cellular structure. Thus, a foaming medium is inherently present, eliminating the need, in most instances, of an external foaming agent, this being especially true where a polybasic acid constitutes the active compound. Occasionally, it proves advantageous to add small amounts of water, say up to about 5% by weight of the mixture, to assist in the foaming action. The use of water merely as an assistant does not add unduly to the curing time of one hour or less which is in distinct contrast to typical present commercial polyurethane foam processes, wherein water is relied upon as the sole or principal foaming agent, which require a post cure of some 24 hours' duration. The density of the foams made as described herein varies not only with the particular isocyanate selected for reaction but with the temperature of the conversion as well. It has been found that as the temperature of this stage is increased, the density of the foam also increases, due presumably to the increased loss of $CO_2$ from the mixture at the higher temperatures.

The toughness and rigidity contributed by the resinous polybasic acids are especially significant in the case of foam structures since such structures made in the past from isocyanate and active hydrogen compound reaction mixtures have, for the most part, been of rather soft, spongy texture. The toughness and rigidity together with the resistance to water and common chemicals that the present foams exhibit as well as a very low density when compounded to this end, constitute a rather exceptional combination in this field, so that the present invention should be particularly valuable in producing foam structures for such uses as insulation, crash linings for vehicles, aircraft, etc., and structural components alone or in conjunction with outer coverings of wood or metal.

For the sake of brevity as well as convenience, most of the remainder of this disclosure will be presented in the form of four tables, the first three giving examples of the three reaction components, along with some pertinent information concerning them, and the fourth providing working examples of the invention in the coating field.

Table 1.—Representative resinous polybasic acids

| No. | Acid | Abbreviation | Isocyanate equivalent (observed) |
|---|---|---|---|
| 1 | Condensation product of DPA[1] and 1,4-dichlorobutane: In a reaction vessel provided with a thermometer, a mechanical agitator, and reflux condenser was added 510 parts of sodium hydroxide in 800 parts of water. With continuous agitation 1,144 parts of 4,4-bis(4-hydroxyphenyl)pentanoic acid was added, and when completely dissolved 279 parts of 1,4-dichlorobutane was added. The continuously agitated mixture was refluxed for 7 hours after which the excess caustic was neutralized with HCl. The aqueous layer was removed by decantation, and the organic acid layer freed from salt by washing four times with hot water. The resinous product was finally freed from the last traces of water by heating with agitation to 125° C. This product had an acid value of 175. | PBR1 | 237 |
| 2 | Condensation product of DPA and 1,4-dichlorobutene-2: In a manner similar to 1 a solution of 858 parts of 4,4-bis(4-hydroxyphenyl) pentanoic acid dissolved in an aqueous alkali solution prepared from 410 parts of sodium hydroxide in 800 parts of water was refluxed for 6 hours with 218 parts of 1,4-dichlorobutene-2. After neutralization with HCl and washing free of salt, the product was freed from the last traces of water by heating with continuous agitation until the temperature had risen to 130° C. The product amounting to 680 parts had an acid value of 165. | PBR2 | 201 |
| 3 | Condensation product of DPA and bis(2-chloroethyl) ether: In an autoclave provided with a mechanical agitator was placed 1,500 parts of water, 300 parts of sodium hydroxide, 858 parts of 4,4-bis(4-hydroxyphenyl) pentanoic acid, and 286 parts of bis(2-chloroethyl)ether. The autoclave was closed and the reaction mixture heated with agitation at 150° C. for a period of 5 hours. The reaction mixture was cooled to below 100° C. so as to release pressure and the product was neutralized with HCl. The aqueous layer was removed by decantation and the resinous product washed 4 times with hot water to remove sodium chloride. The product was finally freed from the last traces of water by heating with continuous agitation to a temperature of 130° C. The product had a softening point of 72° C. and an acid value of 147. | PBR3 | 189.6 |
| 4 | Condensation product of DPA and bis(2-chloroethyl) ether: A mixture of 1,144 parts of 4,4-bis(4-hydroxyphenyl)pentanoic acid, 320 parts of sodium hydroxide, 1,500 parts of water, and 286 parts of bis(2-chloroethyl) ether was treated in the manner described in Example 3 and gave a product having a softening point of 69° C. and an acid value of 164. | PBR4 | 154.6 |

[1] DPA is a trademark for 4,4-bis(4-hydroxyphenyl)pentanoic acid.

It will be observed that an isocyanate equivalent is specified for each acid. The isocyanate equivalent is defined as the weight of the acid which will react with one equivalent of the isocyanate and will be of assistance in selecting actual amounts of the acid that should be used. The method used in determining the observed values as listed involves reacting a sample of the acid with an excess of toluene-2,4-diisocyanate and then determining the excess isocyanate by reaction with di-n-butylamine. Specifically, the technique used is as follows:

To 25 ml. of methyl isobutylketone is added 3 grams of toluene - 2,4 - diisocyanate previously standardized against di-n-butylamine and a weight of the acid such that the diisocyanate is present in approximately 100% excess. To this mixture is added triethylamine in an amount equal to 1% of the total weight of isocyanate and the acid. The mixture is refluxed for a period of one hour. After cooling to room temperature, the condenser walls are rinsed with about 25 ml. of a re-distilled toluene. To this mixture is added 25 ml. of 2 N di-n-butylamine. This mixture is warmed to the boiling point, allowed to stand for one hour at which point 75 ml. of methanol is added, and the excess di-n-butylamine back-titrated with 1 N alcoholic hydrochloric acid. By carrying out the preparation of the acids with great care, values at or approaching the theoretical can be achieved.

The acid number given for each acid has its usual meaning, which is the number of milligrams of potassium hydroxide necessary to neutralize the acid content, 1 gram, of the sample, and provides an indication of the degree of acidity of the product.

It will be noted that an observed and theoretical amine equivalent in specified for each isocyanate. The amine equivalent refers to the weight of the isocyanate containing one isocyanate group and reacting with one mole of di-n-butylamine. Since the isocyanates available commercially are not necessarily chemically pure, the observed values were obtained for use as a guide in formulating reaction products therefrom as these values provide a measure of the actual purity of each compound.

The analytical procedure used to determine amine equivalents of diisocyanates is found in Monsanto Chemical Company's Technical Bulletin No. P-125 and is generally as follows:

Twenty-five milliliters of redistilled toluene and 25 ml. of approximately 2 N di-n-butylamine were placed in a carefully cleaned and dried 250 ml. or 500 ml.

*Table II.—Representative isocyanates*

| No. | Commercial source, trade name, and abbreviation | Structure | Amine equivalent Observed | Amine equivalent Theory |
|---|---|---|---|---|
| 1 | E. I. Du Pont de Nemours & Co., Inc.; Hylene T; Hy T. | 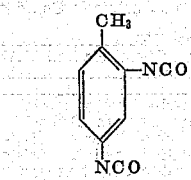 Toluene-2,4-diisocyanate | 90.62 | 87.07 |
| 2 | E. I. Du Pont de Nemours & Co., Inc.; Hylene M; Hy M. | 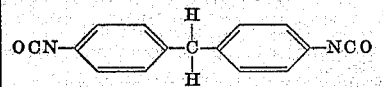 Methylene bis(4-phenyl isocyanate) | 139.98 | 125.12 |
| 3 | National Aniline Div.; Nacconate 200; N 200 |  3,3'-bitolylene-4,4'-diisocyanate | 132.78 | 132.13 |
| 4 | Mobay Chemical Co.; Mondur N5; MO N5 | 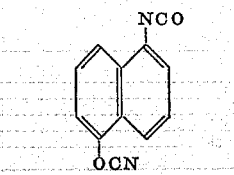 Naphthylene-1,5-diisocyanate | 116.58 | 105.09 |
| 5 | Mobay Chemical Co.; Mondur TM; MO TM | 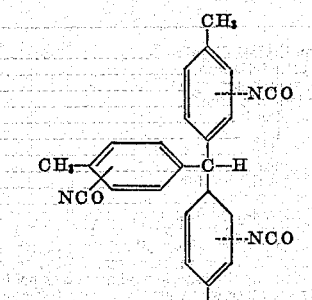 Tritolylmethane triisocyanate | 107.78 | 123.45 |
| 6 | Mobay Chemical Co.; Mondur HX; MO HX | OCN(CH$_2$)$_6$NCO<br>Hexamethylene diisocyanate | 103.39 | 84.01 |
| 7 | Mobay Chemical Co.; Mondur O; MO O | CH$_3$(CH$_2$)$_{17}$NCO<br>Octadecylisocyanate | 342.32 | 295.0 |
| 8 | Shell Development Co.; Durenediisocyanate; Dur | 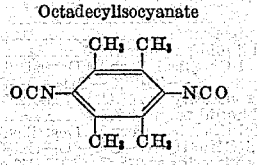 2,3,5,6-tetramethyl-1,4-benzene diisocyanate | 111.22 | 108.12 |

Erlenmeyer flask. The sample of diisocyanate was drawn into a warmed glass bulb and the neck sealed off in a flame. Sample weight is determined by the difference in weight between the empty and the filled bulb. The bulb was immersed in the Erlenmeyer flask and crushed beneath the surface of the liquid. The solution was heated to boiling and allowed to cool 1 hour. 100 ml. of technical methanol and 0.5 ml. of bromophenol blue indicator was added. It was then titrated with 1 N HCl to a yellow end point. The indicator was prepared by taking 0.1 g. of bromophenol blue, 1.5 ml. of 0.1 N NaOH diluted with 100 ml. of distilled $H_2O$. The average precision demonstrated by these determinations was ±1.29%.

*Table III.—Active hydrogen compounds*

A. POLYHYDROXY COMPOUNDS

| Compound | Abbrev. used in tables | Isocyanate equivalent | |
|---|---|---|---|
| | | Observed | Theoretical |
| Ethylene glycol | EG | 27.64 | 31.03 |
| 1,4-butanediol | Budiol | 39.26 | 45.06 |
| Diethylene glycol | DEG | 44.76 | 51.16 |
| Polyethylene glycol 400 | PG 400 | 163.48 | 190–210 |
| (Carbide & Carbon Chemicals Co., described as having M.W. 380–420; viscosity 7.3 centistokes at 210° F.) | | | |
| Polyethylene glycol 1000 | PG 1000 | 409.76 | 500 |
| (Carbide & Carbon Chemicals Co., M.W. 950–1050; viscosity 17.4 centistokes at 210° F.) | | | |
| Glycerol (C.P. grade) | G | 29.53 | 30.67 |
| Pentaerythritol | PN | 24.24 | 34.04 |
| Bis(4-hydroxyphenyl)-dimethyl methane-formaldehyde condensate | BDF | 98.78 | |
| (In a 3 liter, 3-neck flask provided with a mechanical agitator, a thermometer, and a reflux condenser was placed 912 parts of bis(4-hydroxyphenyl)-dimethyl methane, 960 parts of 37% aqueous formaldehyde and 2.3 parts oxalic acid. With continuous agitation the reaction mixture was heated to reflux temperature and refluxing continued for 1 hr. After permitting the reaction mixture to cool to around 50° C. the water layer was removed by decantation. The phenol-formaldehyde layer was then washed 3 times with water which in each case was removed by decantation. The last portion of water was removed by distillation at reduced pressure using a water aspirator system which gave water pressure around 30–40 mm. The flask temp. during the removal of this last portion of water ranged from 70–90° C. The product, amounting to 1,065 parts, was a clear, heavy, syrupy material. The non-volatile content was 83.4%.) | | | |
| p-t-Butylphenol-formaldehyde condensate | BPF | 156.54 | |
| (The procedure of preparation, including the dehydration step, was the same as that used with bis(4-hydroxyphenyl)-dimethyl methane above. A mixture of 1,000 parts of para-tertiary butylphenol, 1,067 parts of 37% aqueous formaldehyde, and 10 parts of sodium hydroxide was used to give a final yield of 1,470 parts of a clear, almost colorless syrupy product. The non-volatile content was 93.6%.) | | | |
| Resorcinol | R | 105.38 | 55.05 |
| Hydroquinone, C.P. | HQ | 161.44 | 55.05 |
| Bis(4-hydroxyphenyl)-dimethyl methane | BDM | 304.22 | 114.0 |

B. POLYBASIC ACIDS

| Compound | Abbrev. used in tables | Isocyanate equivalent | |
|---|---|---|---|
| | | Observed | Theoretical |
| Azelaic acid | AZ | 87.53 | 94.11 |
| Aconitic acid | AcA | 57.28 | 58.03 |
| Fumaric acid | FA | 52.36 | 58.03 |
| Diglycolic acid | DGA | 166.02 | 67.04 |
| Isophthalic acid | IA | 485.29 | 83.06 |

C. POLYAMINES AND POLYAMIDES

| Compound | Abbrev. used in tables | Isocyanate equivalent | |
|---|---|---|---|
| | | Observed | Theoretical |
| Hexamethylenediamine | Hexa | 31.96 | 29.05 |
| Diethylenetriamine | DET | 17.99 | 20.63 |
| Triethylene tetraamine | TT | 27.50 | 26.38 |
| Phenylene diamine | PD | 41.54 | 27.03 |
| Diethanolamine | DEA | 41.2 | 35.05 |
| Adipamide | ADA | 106.22 | 38.04 |
| Phthalamide | PA | 140.36 | 41.04 |
| Malonamide | MA | 63.65 | 25.52 |
| p-Toluenesulfonamide | TSA | 98.63 | 85.60 |
| Polyamide resin | PAR | 380.03 | 312.03 |
| (In a 3 liter, 3-neck flask provided with mechanical agitator, thermometer, and water trap with a reflux condenser above was placed 1,545 parts of Emery Industries, Inc., Dimer Acid #955 (a dimerized soya bean oil acid) and 269 parts of ethylenediamine. The flask was provided with an inlet for an inert gas. With continuous agitation and in an inert atmosphere of nitrogen gas the reaction mixture was heated from 94–220° C. over a period of 12 hours. 165 parts of water were removed from the reaction mixture during this period. The resulting polyamide resin had an acid number of 3.2, and a softening point of 87–89° C. (Durrans' Mercury Method).) | | | |

D. SULFUR-CONTAINING COMPOUNDS

| Compound | Abbrev. used in tables | Isocyanate equivalent | |
|---|---|---|---|
| | | Observed | Theoretical |
| Thiomalic acid | TA | 58.20 | 50.03 |
| Thioglycolic acid | TGA | 35.42 | 46.05 |
| Thiourea | TU | 15.34 | 19.03 |
| 2-mercaptoethanol | 2 ME | | 39.06 |
| Thiokol liquid polymer LP-3 | LP 3 | 773.03 | |
| ((Thiokol Chemical Corp.) Described as having formula $HS—(C_2H_4O—CH_2—O—C_2H_4S—S)_6—C_2H_4—O—CH_2O—C_2H_4—SH$ having viscosity at 25° C. of 700–1,200 centipoises.) | | | |
| Thiokol liquid polymer LP-8 | LP 8 | 380.68 | |
| ((Thiokol Chemical Corp.) Described as having formula $HS(CH_2CH_2—O—CH_2—O—CH_2CH_2SH)_3—CH_2CH_2—O—CH_2—O—CH_2CH_2SH$ having viscosity at 27° C. of 250–350 centipoises.) | | | |

*Table III.—Active hydroden compounds—Continued*

E. POLYESTER RESINS

| Compound | Abbrev. used in tables | Isocyanate equivalent | |
|---|---|---|---|
| | | Observed | Theoretical |
| Polyester resin [1] (A succinic acid, azelaic acid, ethylene glycol, and glycerol polyester.) | PER 1 | 246.1 | |
| Polyester resin [2] (A glycerol, azelaic acid and succinic anhydride polyester.) | PER 2 | 107.4 | |
| Polyester resin [3] (A diethylene glycol, adipic acid and glycerol polyester.) | PER 3 | 929.0 | |
| Polyester resin [4] (A diethylene glycol and adipic acid polyester.) | PER 4 | 480.5 | |
| Polyester resin [5] (A diethylene glycol and phthalic anhydride polyester.) | PER 5 | 1,046 | |

[1] In a 3-neck flask provided with a thermometer, a condenser attached through a water trap, and a mechanical stirrer was placed 502 parts succinic anhydride, 943 parts azelaic acid, and 414 parts ethylene glycol. The reaction mixture was gradually heated to 204° C. with continuous agitation at which point a sufficient amount of xylene was added to give constant refluxing at 195–204° C. After refluxing for 2 hours at 195–204° C., 462 parts of glycerol was added dropwise over a period of 1 hour and 10 minutes. Refluxing was continued for 2 hours and 15 minutes at 204–220° C. at which point most of the xylene was removed by distillation. The viscous syrupy product had a non-volatile content of 96.5% and an acid value of 6.

[2] As in the preparation of PER 1, 925 parts of glycerol, 785 parts azelaic acid, and 418 parts of succinic anhydride were refluxed with xylene at 184–204° C. for 3½ hours. Most of the xylene was removed by distillation at 200–205° C. The viscous syrupy product had a non-volatile content of 95% and acid value of 7.6.

[3] As in the preparation of PER 1, 212 parts of diethylene glycol, 292 parts of adipic acid, and 2 parts of glycerol were refluxed with xylene at 200–225° C. for 6 hours. The xylene was removed by heating at 220–225° C. with reduced pressure of around 70–80 mm. The viscous syrupy product had an acid value of 12.8.

[4] As in the preparation of PER 1, 212 parts of diethylene glycol and 292 parts of adipic acid were refluxed with xylene at 200–225° C. for 6 hours. The xylene was removed by heating at 200–225° C. with reduced pressure of around 70–80 mm. The viscous syrupy product had an acid value of 87.

[5] As in the preparation of PER 1, 212 parts diethylene glycol and 355 parts of phthalic anhydride were refluxed with xylene at 200–225° C. for 6 hours. The xylene was removed by heating at 220–225° C. with reduced pressure of around 70–80 mm. The viscous syrupy product had an acid value of 60.

The following examples, presented in tabular form to conserve space, illustrate the conversion of mixtures of resinous acids and polyisocyanates alone and modified with a monoisocyanate to insoluble, infusible products. Each of the resinous acids was dissolved in the designated solvent to a non-volatile content of 40–60%. The isocyanates and modifiers were used in most examples at 100% non-volatile content. In some instances, however, the modifier was dissolved in small amounts of the same solvent for solubility purposes. The mix-

*Table IV.—Examples of the invention as a coating*

A. POLYHYDROXY COMPOUND

| Ex. No. | Polybasic acid | Parts | Isocyanate | Parts | Triethylamine, parts | Active compound | Parts | Solvent | Conversion Time (hrs.) | Conversion Temp., °C. | Film properties | Withstood in hrs. H₂O at 100° C. | Withstood in hrs. 5% aq. NaOH at 25° C. |
|---|---|---|---|---|---|---|---|---|---|---|---|---|---|
| I | PBR 2 | 95 | HY T | 50 | | PG 1000 | 21 | MIK | 0.5 | 175 | Flexible | 16+ | 72+ |
| II | PBR 2 | 101 | HY M | 140 | | DEG | 22 | MIK | 0.5 | 175 | Brittle | 16+ | 72+ |
| III | PBR 4 | 77 | HY M | 112 | | BDF | 30 | 50:50 MIK:Diox | 0.5 | 175 | do | 16+ | 72+ |
| IV | PBR 1 | 119 | HY M | 126 | | BDM | 46 | MIK | 0.5 | 175 | Flexible | 16+ | 72+ |
| V | PBR 1 | 119 | MO HX | 114 | | G | 18 | MIK | 0.5 | 175 | do | 16+ | 72+ |
| VI | PBR 2 | 101 | MO HX | 207 | | R | 52 | MIK | 0.5 | 175 | do | 16+ | 72+ |
| VII | PBR 3 | 95 | N 200 | 120 | | BPF | 63 | MIK:Diox | 0.5 | 175 | Brittle | 16+ | .2 |
| VIII | PBR 2 | 101 | MO TM | 119 | | PG 400 | 98 | MIK | 0.5 | 175 | Flexible | 16+ | 72+ |
| IX | PBR 3 | 95 | MO N5 | 105 | | EG | 11 | MIK:Diox | 0.5 | 175 | Brittle | .2 | .2 |
| X | PBR 4 | 77 | Dur | 111 | | Budiol | 20 | MIK:Diox | 0.5 | 175 | do | .2 | .08 |
| XI | PBR 4 | 77 | HY M | 112 | | PN | 7 | MIK:Diox | 0.5 | 175 | do | 16+ | 72+ |
| XII | PBR 2 | 101 | MO HX | 103 | | HQ | 81 | MIK:Diox | 0.5 | 175 | Flexible | .2 | 4 |

B. POLYBASIC ACIDS

| Ex. No. | Polybasic acid | Parts | Isocyanate | Parts | Triethylamine, parts | Active compound | Parts | Solvent | Time (hrs.) | Temp., °C. | Film properties | H₂O at 100° C. | 5% aq. NaOH at 25° C. |
|---|---|---|---|---|---|---|---|---|---|---|---|---|---|
| XIII | PBR 1 | 119 | HY T | 82 | | Az | 35 | MIK | 0.5 | 175 | Brittle | 16+ | 50+ |
| XIV | PBR 2 | 8 | HY T | 73 | 1.8 | AcA | 23 | MIK | 0.5 | 175 | do | 16+ | 1.5 |
| XV | PBR 3 | 95 | HY T | 55 | 5.4 | IA | 8 | Dioxane | 0.5 | 175 | do | 16+ | 50+ |
| XVI | PBR 4 | 77 | HY T | 91 | 3.6 | FA | 26 | do | 0.5 | 175 | Brittle | 16+ | 50+ |
| XVII | PBR 1 | 119 | HY M | 112 | | FA | 16 | MIK | 0.5 | 175 | do | 16+ | 6 |
| XVIII | PBR 3 | 95 | HY M | 112 | 1.8 | FA | 16 | Dioxane | 0.5 | 175 | do | 16+ | 50+ |
| XIX | PBR 4 | 77 | HY M | 98 | 1.8 | DGA | 13 | do | 0.5 | 175 | do | 16+ | 50+ |
| XX | PBR 4 | 77 | MO HX | 72 | 1.8 | IA | 17 | do | 0.5 | 175 | Flexible | 10+ | 6 |
| XXI | PBR 3 | 95 | MO HX | 62 | | AcA | 6 | do | 0.5 | 175 | do | 16+ | 50+ |
| XXII | PBR 2 | 101 | MO HX | 93 | 1.8 | DGA | 27 | MIK | 0.5 | 175 | do | 10+ | .08 |
| XXIII | PBR 2 | 101 | MO TM | 86 | | Az | 26 | MIK | 0.5 | 175 | Brittle | 16+ | 10 |
| XXIV | PBR 3 | 95 | MO TM | 75 | 1.8 | FA | 11 | Dioxane | 0.5 | 175 | do | 8 | 50+ |
| XXV | PBR 4 | 62 | MO TM | 86 | 1.8 | DGA | 27 | do | 0.5 | 175 | do | 16+ | 50+ |
| XXVI | PBR 3 | 95 | N 200 | 120 | 3.6 | DGA | 27 | do | 0.5 | 175 | do | 16+ | 1.5 |

C. POLYAMINES AND POLYAMIDES

| Ex. No. | Polybasic acid | Parts | Isocyanate | Parts | Triethylamine, parts | Active compound | Parts | Solvent | Time (hrs.) | Temp., °C. | Film properties | H₂O at 100° C. | 5% aq. NaOH at 25° C. |
|---|---|---|---|---|---|---|---|---|---|---|---|---|---|
| XXVII | PBR 1 | 48 | HY T | 27 | | TT | 3 | MIK | 0.5 | 175 | Flexible | 16+ | 0.2 |
| XXVIII | PBR 3 | 38 | HY T | 36 | | HEXA | 6 | Dioxane | 0.5 | 175 | do | 16+ | 50+ |
| XXIX | PBR 1 | 48 | HY T | 36 | | MA | 5 | MIK | 0.5 | 175 | Brittle | 16+ | 6 |
| XXX | PBR 1 | 357 | HY M | 280 | | TSA | 43 | MIK | 0.5 | 175 | do | 16+ | 50+ |
| XXXI | PBR 4 | 170 | HY M | 196 | | DET | 5 | Dioxane | 0.5 | 175 | do | 16+ | 50+ |
| XXXII | PBR 1 | 238 | MO HX | 124 | 7.2 | HEXA | 6 | MIK | 0.5 | 175 | Flexible | 16+ | 12 |
| XXXIII | PBR 4 | 278 | MO HX | 207 | | PA | 8 | Dioxane | 0.5 | 175 | do | 16+ | 2.5 |
| XXXIV | PBR 2 | 20 | MO TM | 21 | | PD | 4 | MIK | 0.5 | 175 | Brittle | 16+ | 24 |
| XXXV | PBR 2 | 201 | MO TM | 129 | | PAR | 76 | MIK | 0.5 | 175 | do | 16+ | 50+ |
| XXXVI | PBR 3 | 95 | HY M | 98 | | DEA | 8 | Dioxane | 0.5 | 175 | do | 16+ | 96+ |
| XXXVII | PBR 4 | 77 | MO HX | 62 | | DEA | 4 | do | 0.5 | 175 | do | 7 | 96+ |
| XXXVIII | PBR 2 | 101 | N 200 | 80 | | DEA | 4 | MIK | 0.5 | 175 | Flexible | 16+ | 22 |
| XXXIX | PBR 1 | 40 | MO HX | 31 | | ADA | 38 | MIK | 0.5 | 175 | do | 16+ | 6 |

Table IV—Continued

D. SULFUR-CONTAINING COMPOUNDS

| Ex. No. | Polybasic acid | Parts | Isocyanate | Parts | Triethylamine, parts | Active compound | Parts | Solvent | Conversion Time (hrs.) | Conversion Temp., °C. | Film properties | Withstood in hrs. H₂O at 100° C. | Withstood in hrs. 5% aq. NaOH at 25° C. |
|---|---|---|---|---|---|---|---|---|---|---|---|---|---|
| XL | PBR 1 | 119 | HY T | 54 | 5.4 | LP 3 | 50 | MIK | 0.5 | 200 | Flexible | 16+ | 96+ |
| XLI | PBR 1 | 119 | HY T | 91 | | TGA | 18 | MIK | 0.5 | 175 | Brittle | 16+ | 2 |
| XLII | PBR 4 | 77 | HY T | 91 | | TU | 8 | Dioxane | 0.5 | 175 | ...do | 4 | 26.5 |
| XLIII | PBR 4 | 77 | HY M | 140 | | LP 3 | 250 | ...do | 0.5 | 200 | Flexible | 16+ | 96+ |
| XLIV | PBR 4 | 42 | HY M | 42 | | 2ME | 4 | ...do | 0.5 | 175 | ...do | 16+ | 50+ |
| XLV | PBR 2 | 101 | MO HX | 62 | | LP 8 | 30 | MIK | 0.5 | 175 | ...do | 16+ | 32+ |
| XLVI | PBR 3 | 95 | MO HX | 124 | | PGA | 25 | Dioxane | 0.5 | 175 | ...do | .8 | 96+ |
| XLVII | PBR 3 | 95 | MO TM | 108 | | LP 3 | 250 | ...do | 0.5 | 200 | ...do | 16+ | 32+ |
| XLVIII | PBR 1 | 119 | HY M | 98 | | TA | 12 | MIK | 0.5 | 175 | ...do | 16+ | 1 |

E. POLYESTER RESINS

| Ex. No. | Polybasic acid | Parts | Isocyanate | Parts | Triethylamine, parts | Active compound | Parts | Solvent | Conversion Time (hrs.) | Conversion Temp., °C. | Film properties | Withstood in hrs. H₂O at 100° C. | Withstood in hrs. 5% aq. NaOH at 25° C. |
|---|---|---|---|---|---|---|---|---|---|---|---|---|---|
| XLIX | PBR 1 | 71 | HY T | 109 | | PER 1 | 219 | MIK | 0.5 | 175 | Flexible | 16+ | 57+ |
| L | PBR 1 | 71 | HY M | 84 | | PER 1 | 73 | MIK | 0.5 | 175 | ...do | 16+ | 57+ |
| LI | PBR 1 | 141 | MO HX | 67 | 1.80 | PER 4 | 24 | MIK | 0.5 | 175 | ...do | 16+ | 1 |
| LII | PBR 1 | 59 | MO HX | 78 | | PER 2 | 62 | MIK | 0.5 | 175 | ...do | 16+ | 3 |
| LIII | PBR 1 | 71 | N 200 | 120 | | PER 1 | 146 | MIK | 0.5 | 175 | ...do | 16+ | 57+ |
| LIV | PBR 1 | 71 | MO TM | 188 | | PER 5 | 52 | MIK | 0.5 | 175 | Brittle | 16+ | 57+ |
| LV | PBR 1 | 109 | MO N5 | 58 | 1.80 | PER 4 | 12 | MIK | 0.5 | 175 | ...do | 16+ | .08 |
| LVI | PBR 3 | 28 | HY T | 27 | | PER 1 | 37 | MIK | 0.5 | 175 | Flexible | 16+ | 144+ |
| LVII | PBR 2 | 30 | HY M | 42 | | PER 1 | 37 | MIK | 0.5 | 175 | ...do | 16+ | 144+ |
| LVIII | PBR 2 | 111 | HY M | 84 | | PER 3 | 47 | MIK | 0.5 | 175 | ...do | 16+ | 48+ |
| LIX | PBR 2 | 50 | N 200 | 66 | | PER 2 | 31 | MIK | 0.5 | 175 | Brittle | 16+ | 144+ |
| LX | PBR 2 | 60 | MO TM | 188 | | PER 5 | 50 | Dioxane | 0.5 | 175 | ...do | 16+ | 144+ |
| LXI | PBR 3 | 47 | MO HX | 78 | | PER 2 | 62 | ...do | 0.5 | 175 | Flexible | 16+ | 14+ |
| LXII | PBR 3 | 113 | HY T | 59 | 1.80 | PER 4 | 25 | ...do | 0.5 | 175 | ...do | 16+ | 144+ |
| LXIII | PBR 3 | 104 | MO TM | 373 | | PER 3 | 47 | ...do | 0.5 | 175 | Brittle | 16+ | 144+ |
| LXIV | PBR 3 | 56 | Dur | 39 | | PER 5 | 53 | ...do | 0.5 | 175 | Flexible | 1.5 | .08 |
| LXV | PBR 4 | 93 | HY T | 59 | 1.80 | PER 4 | 24 | ...do | 0.5 | 175 | ...do | 16+ | 2.5 |
| LXVI | PBR 4 | 39 | HY M | 105 | | PER 2 | 62 | ...do | 0.5 | 175 | ...do | 16+ | 120+ |
| LXVII | PBR 4 | 159 | MO HX | 124 | | PER 1 | 37 | ...do | 0.5 | 175 | ...do | 16+ | 24 | tures thus obtained were applied to glass panels at .002" wet film thickness. The table gives the heat treatment used for conversion and indication of film flexibility and water and alkali resistance in actual applications. All parts are by weight.

It will be understood that the description of flexibility is purely relative and indicates merely whether or not a substantial part of the film could be peeled or stripped intact from the panel. Varying degrees of flexibility or brittleness are encompassed by the general descriptive terms used. Products which might be too brittle for use on film wherein considerable flexibility was a requisite would nevertheless be useful in films where flexibility is of no importance or in cast or molded articles.

In order to demonstrate the preparation of a foam resin structure in accordance with the invention, the following examples were prepared:

*Example LXVIII.*—309 parts of PBR 4, 40 parts of polyoxyethylene sorbitan mono-oleate, an emulsifier sold under the tradename "Tween 80" by Atlas Powder Company, 3.6 parts of triethylamine and 488 parts of PER 1 were stirred in an open container to a homogeneous mixture with sufficient heat being supplied to liquify the polybasic acid. 414 parts of hexamethylene diisocyanate were added, with continuous stirring, following which the temperature of the mixture was raised to 110° C. The reaction occurred instantaneously with vigorous foaming. The mass solidified within a short period of time, although heating was continued for a total of about five minutes in order to insure that a complete cure had been effected. The product was a rigid and flexible foam.

*Example LXIX.*—Example LXVIII was repeated, except that 464 parts of PBR 4 and 244 parts of PER 1 were employed. The foam was essentially similar to that of the preceding example, being rigid, yet flexible.

*Example LXX.*—Example LXVIII was repeated, except that 464 parts of PBR 4, 244 parts of PER 1 and 517 parts of hexamethylene diisocyanate were employed. The foam that was produced was sponge-like and only moderately rigid.

*Example LXXI.*—Example LXVIII was repeated, except that 402 parts of PBR 2, 45 parts of emulsifier and 560 parts of methylene bis(4-phenyl isocyanate) were employed. This foam was rigid, yet flexible, and was characterized by a very uniform cell dispersion throughout.

The aforegoing examples are furnished only for the guidance of those seeking to practice the invention and not for the purpose of defining the boundaries within which it is operative. Numerous other embodiments are possible and will be suggested by these few illustrations.

Having thus described the invention, that which is claimed is:

1. A composition of matter comprising the reaction product of (A) an organic polyisocyanate, (B) an organic compound containing at least two active hydrogen atoms, each of said active hydrogen atoms being present in a compound selected from the group consisting of polyesters which are the reaction products of polyhydric alcohols and polycarboxylic acids, polyhydric alcohols, polyhydric phenols, polyamines, polyamides, polycarboxylic acids, mixtures thereof and any of the above compounds in which at least one oxygen atom has been replaced by sulfur and (C) a polycarboxylic ether acid of (1) a pentanoic acid consisting essentially of 4,4-bis-(4-hydroxyaryl)pentanoic acid wherein the hydroxyaryl radical is a hydroxyphenyl radical and is free from substituents other than alkyl groups of from 1–5 carbon atoms and (2) a coupling agent having a total of from 2 to 10 carbon atoms and having the structural formula X—A—X wherein X is a member of the group consisting of halogen atoms and vicinal epoxide groups and A is a divalent radical selected from the group consisting of alkylene, hydroxyalkylene, dialkylene ether, vinylene, and mixtures thereof; wherein (A) and (B)+(C) are present on an equivalent ratio of from about 5:1 to 1:5 with (B) constituting from 5 to 65% of (B)+(C).

2. The composition of matter of claim 1 wherein the pentanoic acid of (C–1) consists essentially of 4,4 bis (4-hydroxyaryl)pentanoic acid wherein the hydroxyaryl radical is a hydroxyphenyl radical and is free from substituents other than alkyl groups of one carbon atom.

3. The composition of matter of claim 1 wherein the pentanoic acid of (C-1) is 4,4 bis(4-hydroxyphenyl) pentanoic acid.

4. The composition of matter of claim 3 wherein (A) and (B)+(C) are present on an equivalent ratio of from about 2:1 to 1:2 with (B) constituting from 5 to 65% of (B)+(C).

5. The composition of matter as described in claim 4 wherein (A) is an aromatic polyisocyanate.

6. The composition of matter as described in claim 7 wherein (A) is an aliphatic polyisocyanate.

7. A composition of matter comprising the reaction product of (A) a mixture of organic monoisocyanates and polyisocyanates wherein at least 50% of the mixture is an organic polyisocyanate, (B) an organic compound containing at least two active hydrogen atoms, each of said active hydrogen atoms being present in a compound selected from the group consisting of polyesters which are the reaction products of polyhydric alcohols and polycarboxylic acids, polyhydric alcohols, polyhydric phenols, polyamines, polyamides, polycarboxylic acids, mixtures thereof and any of the above compounds in which at least one oxygen atom has been replaced by sulfur and (C) a polycarboxylic ether acid of (1) a pentanoic acid consisting essentially of 4,4 bis(4-hydroxyaryl)pentanoic acid wherein the hydroxyaryl radical is a hydroxyphenyl radical and is free from substituents other than alkyl groups of from 1-5 carbon atoms and (2) a coupling agent having a total of from 2 to 10 carbon atoms and having the structural formula X—A—X wherein X is a member of the group consisting of halogen atoms and vicinal epoxide groups and A is a divalent radical selected from the group consisting of alkylene, hydroxyalkylene, dialkylene ether, vinylene, and mixtures thereof wherein (A) and (B)+(C) are present on an equivalent ratio of from about 5:1 to 1:5 with (B) constituting from 5 to 65% of (B)+(C).

8. A composition of matter comprising the cellular reaction product of (A) an organic polyisocyanate, (B) an organic compound containing at least two active hydrogen atoms, each of said active hydrogen atoms being present in a compound selected from the group consisting of polyesters which are the reaction products of polyhydric alcohols and polycarboxylic acids, polyhydric alcohols, polyhydric phenols, polyamines, polyamides, polycarboxylic acids, mixtures thereof and any of the above compounds in which at least one oxygen atom has been replaced by sulfur, (C) a polycarboxylic ether acid of (1) a pentanoic acid consisting essentially of 4,4 bis(4-hydroxyaryl)pentanoic acid wherein the hydroxyaryl radical is a hydroxyphenyl radical and is free from substituents other than alkyl groups of from 1-5 carbon atoms and (2) a coupling agent having a total of from 2 to 10 carbon atoms and having the structural formula X—A—X wherein X is a member of the group consisting of halogen atoms and vicinal epoxide groups and A is a divalent radical selected from the group consisting of alkylene, hydroxyalkylene, dialkylene ether, vinylene, and mixtures thereof; wherein (A) and (B)+(C) are present on an equivalent ratio of from about 5:1 to 1:5 with (B) constituting from 5 to 65% of (B)+(C), and (D) up to about 5% of the total weight of (A), (B) and (C) of water.

9. A method of preparing a new composition of matter which comprises admixing (A) an organic polyisocyanate, (B) an organic compound containing at least two active hydrogen atoms, each of said active hydrogen atoms being present in a compound selected from the group consisting of polyesters which are the reaction products of polyhydric alcohols and polycarboxylic acids, polyhydric alcohols, polyhydric phenols, polyamines, polyamides, polycarboxylic acids, mixtures thereof and any of the above compounds in which at least one oxygen atom has been replaced by sulfur and (C) a polycarboxylic ether acid of (1) a pentanoic acid consisting essentially of 4,4 bis(4-hydroxyaryl)pentanoic acid wherein the hydroxyaryl radical is a hydroxyphenyl radical and is free from substituents other than alkyl groups of from 1-5 carbon atoms and (2) a coupling agent having a total of from 2 to 10 carbon atoms and having the structural formula X—A—X wherein X is a member of the group consisting of halogen atoms and vicinal epoxide groups and A is a divalent radical selected from the group consisting of alkylene, hydroxyalkylene, dialkylene ether, vinylene, and mixtures thereof; wherein (A) and (B)+(C) are present on an equivalent ratio of from about 5:1 to 1:5 with (B) constituting from 5 to 65% of (B)+(C), and heat converting said mixture to an insoluble, infusible resin.

No references cited.

UNITED STATES PATENT OFFICE

CERTIFICATE OF CORRECTION

Patent No. 2,907,718                          October 6, 1959

Sylvan O. Greenlee

It is hereby certified that error appears in the printed specification of the above numbered patent requiring correction and that the said Letters Patent should read as corrected below.

Columns 3 and 4, right-hand portion of the term immediately above formula IV, for "1,4-dichlorobutane" read -- 1,4-dichlorobutene --; column 9, line 46, for "taken" read -- taking --; column 13, line 11, for "in" read -- is --; columns 15 and 16, Table III, the formula in the next to the last line thereof should appear as shown below instead of as in the patent:

columns 17 and 18, Table IV, B. POLYBASIC ACIDS, in the first column headed "Parts", second item, for "8" read -- 80 --; column 20, line 67, column 21, line 34, and column 22, lines 12 and 38, for "A", each occurrence, read -- (A) --; column 21, line 12, for the claim reference numeral "7" read -- 4 --.

Signed and sealed this 4th day of October 1960.

(SEAL)
Attest:

KARL H. AXLINE                              ROBERT C. WATSON
Attesting Officer                         Commissioner of Patents